US006629768B2

(12) United States Patent
Melson et al.

(10) Patent No.: US 6,629,768 B2
(45) Date of Patent: Oct. 7, 2003

(54) LAMP WITH AN UNPOLISHED SURFACE AND RADIANT SOURCE LAMPS WITH A TRANSPARENT COVER FOR THE RADIANT SOURCE

(75) Inventors: Sabine Melson, Mainz (DE); Peter Nass, Mainz (DE)

(73) Assignee: Schott Glas, Mainz (DE)

( * ) Notice: Subject to any disclaimer, the term of this patent is extended or adjusted under 35 U.S.C. 154(b) by 162 days.

(21) Appl. No.: 09/828,286

(22) Filed: Apr. 6, 2001

(65) Prior Publication Data

US 2002/0044447 A1 Apr. 18, 2002

(30) Foreign Application Priority Data

Apr. 8, 2000 (DE) .......................... 100 17 696

(51) Int. Cl.⁷ ................ F21V 3/00; F21V 5/00
(52) U.S. Cl. ................ 362/311; 362/257; 362/317; 362/310; 362/326
(58) Field of Search .................. 362/257, 317, 362/311, 310, 362, 326; 359/798, 799, 800

(56) References Cited

U.S. PATENT DOCUMENTS

| 1,511,190 A | * | 10/1924 | Cadieux ............... 362/257 |
|---|---|---|---|
| 3,497,753 A | | 2/1970 | Huston, Jr. |
| 4,342,142 A | | 8/1982 | Nieda et al. |
| 4,659,318 A | | 4/1987 | Bunk et al. |
| 4,840,593 A | | 6/1989 | Takeda et al. |
| 5,216,322 A | | 6/1993 | Fuchs |
| 5,883,468 A | | 3/1999 | Hobbs et al. |
| 6,183,113 B1 | * | 2/2001 | Waldmann ............... 362/288 |

FOREIGN PATENT DOCUMENTS

| JP | 3065529 | 3/1991 |
|---|---|---|
| JP | 5325893 | 12/1993 |
| JP | 7296782 | 11/1995 |

OTHER PUBLICATIONS

WO 01/43207, Organic LED Display and a Method for Producing Same, Carl–Zeiss–stiftung.*

* cited by examiner

Primary Examiner—Stephen Husar
Assistant Examiner—Sharon Payne
(74) Attorney, Agent, or Firm—Nils H. Ljungman & Associates (57) ABSTRACT

A lamp with an unpolished surface is herein described. The lamp comprises a closed body which comprises a source of light adapted to be connected to a source of power, contacts to connect said source of light to a source of power, and a cover. The cover is configured and disposed to permit light to exit the lamp when connected to a source of power. The cover comprises an inner surface facing the interior of the lamp and an outer surface facing away from the lamp. At least the outer surface facing away from the lamp comprises unpolished glass configured to provide the unpolished surface. The unpolished glass of the outer surface comprises a surface having a roughness which is minimized.

21 Claims, 2 Drawing Sheets

FIG. 1

Prior Art

FIG. 2

LAMP WITH AN UNPOLISHED SURFACE AND RADIANT SOURCE LAMPS WITH A TRANSPARENT COVER FOR THE RADIANT SOURCE

BACKGROUND OF THE INVENTION

1. Field of the Invention

A lamp with an unpolished surface is herein described. The lamp comprises a closed body which comprises a source of light adapted to be connected to a source of power, contacts to connect said source of light to a source of power, and a cover. The cover is configured and disposed to permit light to exit the lamp when connected to a source of power. The cover comprises an inner surface facing the interior of the lamp and an outer surface facing away from the lamp. At least the outer surface facing away from the lamp comprises unpolished glass configured to provide the unpolished surface. The invention also relates to radiant source lamps such as halogen lamps with a transparent cover for the radiant source.

2. Background Information

Lamps should be easy-to-clean so as to present an appealing appearance of the assembly.

Lamps are usually comprised of a filament in a closed body containing the filament. Such closed body is usually sealed to provide a tight envelope, for example, to retain a gas disposed in the closed body.

There are further provided contacts to connect the lamp to a source of power, as well as electrodes connecting the filament and the contacts.

Such lamps are typically comprised of a base element, which base element serves to hold a bulb or the like source of light which is connectable to a source of power.

Covers are proposed for such lamps, which covers can be made of transparent glass to radiate the energy emitted by the source of light.

Thus, such covers include a first surface which is facing the source of radiant light, and they include a second surface which faces away from the source of light.

Such second surface of the cover facing away from the source of light is prone to collect dust and dirt and this accumulation becomes quite difficult to remove with time, particularly in the case of a lamp having a surface that is rather rough to the touch.

To alleviate such roughness, hitherto it has been suggested to furnish the glass of such covers with a polished surface, that is, the second surface facing away from the source of light is comprised of a polished glass.

Production of such polished surface in the float glass process requires a ribbon of glass to be drawn from the glass-melting furnace and then, to smooth the surface, the glass, while still deformable, is drawn over a metal bath, for example, consisting of molten tin.

Of course, such polished surface provides for an easy-to-clean surface of the surface of the cover which faces away from the source of light.

However, in order to achieve a polished surface of glass there will be required extra processing steps in the production of the lamp assembly, particularly in the manufacture of the pertaining cover with at least one polished glass surface that is to face away from the source of light.

Thus, the production of polished glass surfaces for a cover for a lamp entails additional expenses in the production of the pertaining glass cover with a polished surface which affect the economics of the lamp assembly as such.

There exists, accordingly, a problem in terms of providing for cleanliness and economics.

Lamps, including halogen lamps, arc discharge lamps and the like light emitting lamps, are well known in the art.

U.S. Pat. No. 3,497,753 issued to Huston, Jr. on Feb. 24, 1970 and entitled "Incandescent lamp", refers to a single-ended quartz halogen lamp having a connecting member at the end of a filament leg to physically support the filament and provide the electrical connection to a lead-in wire. A coil at the end of the filament leg encircles and connects to a coaxial end of the connecting member. Another coil on the other end of the connecting member encircles and connects to the terminus of the lead-in wire. The terminus of the lead-in wire is disposed in a centrally located exhaust tube tipoff, thereby aligning the filament coaxially within the lamp envelope.

The prior art according to Huston, Jr. also shows small quartz halogen lamps in which lead-in wires are supported only by a seal at the base of the lamp. As lamp sizes increases, it becomes necessary to provide additional support for the lead-in wires and filaments, especially in lamps where the filament is mounted coaxially within the lamp envelope. In some of these lamps, the end of a lead-in wire is positioned within the residual fused tip of the exhaust tube and the filament leg is directly connected thereto. This construction is satisfactory for lower wattage lamps, but in higher wattage lamps the fused tip can overheat and this could lead to premature failure. If the distance between the filament and the envelope tip were increased by, for example, increasing the length of the filament leg, the resultant construction would be generally too weak to maintain the filament in coaxial alignment for the life of the lamp. In addition, in those filaments in which the filament body, leg, and coil are machine wound from an integral piece of wire, there exists a practical limit imposed by the coiling equipment to the length of the leg that could be produced and to the diameter of the coil at the end of the filament leg. Where connection is established by inserting the end of the lead-in wire into the coil at the end of the filament leg, the diameter of the lead-in wire that could be used is limited to the inside diameter of the coil. This can result in the use of a lead-in wire that does not have sufficient rigidity to maintain the filament in a position that is substantially coaxial and stable throughout the useful life of the lamp.

For a fluorescent lamp bulb according to U.S. Pat. No. 4,303,290 issued to Tsunekawa et al. on Dec. 1, 1981 and entitled "Method of evacuating a fluorescent lamp bulb", a lamp bulb is first decompressed to a pressure level higher than a prescribed final seal pressure, and a desired gas is introduced into the bulb and is expelled, while maintaining the intrabulb pressure at a level attained in the first decompression step. Then the intrabulb pressure is reduced from the maintained pressure level to the prescribed final seal pressure.

Sealed-beam type electric bulbs of the type comprising a tungsten halogen lamp according to U.S. Pat. No. 4,342,142 issued to Nieda et al. on Aug. 3, 1982 and entitled "Method for manufacturing sealed-beam type electric bulb", have the advantages of high efficiency, long service life and high-power application, compared to bulbs in which tungsten filaments are sealed directly in an air-tight container. However, the former has drawbacks in that, when installing a tungsten halogen lamp in an air-tight container, complicated work is involved in mounting the tungsten filaments of the tungsten halogen lamp at or at a spot a predetermined precise distance from the focus of the reflector formed on the container inner surface. The precision of the mounting of the tungsten filaments is not high. The reason for this is that it is difficult to precisely fix the relative positions of the tungsten halogen lamp bulb external surface, the filaments, and the external lead wires for each tungsten halogen lamp bulb for manufacturing each sealed-beam electric bulb. These tungsten halogen lamps thus have to be installed in air-tight containers under visual checking of the filament position for each bulb. The external bulb or air-tight container of a conventional sealed-beam type electric bulb comprises a borosilicate glass reflector coated with a reflecting film on its inner surface, and a lens formed with the same glass material. A ferrule made of an Fe—Ni alloy is attached to the reflector. To install a tungsten halogen lamp bulb in this air-tight container while each external lead wire for the tungsten halogen lamp bulb is inserted in the ferrule, the bulb is shifted while visually checking the position of the lamp filaments. When the predetermined filament position is obtained, the external lead wires are soldered to the ferrule. This soldering work is complicated and has the danger of a slight shift in the external wire position relative to the ferrule, i.e. the position of the tungsten halogen lamp upon soldering. Therefore, the workability and yield of the manufacture of such sealed-beam type electric bulbs are poor.

In the apparatus and method of U.S. Pat. No. 4,495,443 issued to Cummings on Jan. 22, 1985 and entitled "Compact fluorescent lamp combination, and method of making it", there is first selected a compact fluorescent lamp having a small fluorescent tube and also having a base. There are two contact pins on the base. There is also a starter housing which projects from the base on the side thereof remote from the tube. There is also selected a screw plug having a metal screw portion adapted to screw into a socket for an incandescent lamp bulb, and also having a contact button, the screw portion and contact button being mounted on a hollow insulating body which has a flange at its end remote from the contact button. The flange is recessed and has diametrically-opposed boss portions on opposite sides of the body. There is then mounted, on the flange portion, a thin, insulating socket having conductive pin sockets therein adapted to receive the contact pins of the fluorescent lamp. The insulating socket also has an opening adapted to receive the starter housing. The socket is sufficiently thin that the starter housing projects downwardly, far into the body. The insulation socket is so mounted on the flange that, when the fluorescent lamp is assembled with the socket, the pins and pin sockets are disposed laterally of the boss portions instead of being registered therewith. A "ballast" coil and electrical connectors complete the apparatus, which ballast is caused to be in series-circuit relationship relative to the fluorescent lamp.

So as to eliminate the necessity for supervising the composition of a fill being introduced to a halogen incandescent lamp bulb, and so that the proportion of halogen-containing additive and inert gas will be at a predetermined ratio, by spectroscopic and other similar means, the halogen-containing additive according to U.S. Pat. No. 4,659,318 issued to Bunk et al. on Apr. 21, 1987 and entitled "Method to introduce a fill gas mixture into an electric light bulb, particularly halogen incandescent lamp", is placed, in solid or liquid phase, in a mixing vessel at a temperature (T1) which is in excess of a temperature (T2) which is necessary to result in the vapor pressure to enrich the inert gas at the predetermined quantity. The inert gas is conducted into the vessel and thereby excessively enriched. The excessively enriched inert gas is passed through a condenser, the temperature of which is accurately controlled to the temperature (T2) to thereby condense out the excess halogen additive, so that the mixture then will have the desired relationship of halogen containing additive and inert gas. This mixture is then filled into the lamp. If the halogen is present in the form of a carbon-containing compound, or a hydrocarbon compound, it is conducted first over a cracking unit, such as quartz granules heated to 900 degrees Celsius, so as to remove any carbon. Composite fill mixtures of, preferably, the same inert gas, such as argon, with different halogen additives, such as bromine or iodine, can be mixed in a blender of constant flow throughput.

U.S. Pat. No. 4,840,593 issued to Takeda et al on Jun. 20, 1989 and entitled "Low pressure mercury vapor discharge lamp and preparation thereof", refers to a process in which is prepared a low pressure mercury vapor discharge lamp having a bulb and an end plate connected to the bottom of the bulb. The steps of the process involve the application of an adhesive on one surface of the end plate, and the subsequent insertion of an exhaust tube into the end plate in such a way that an enlarged diameter portion of the exhaust tube has an adhesive formed on this portion. As a result of the location and the structure of the steps, it is possible to provide a single step method of heating which functions to perform the essential bonding of all parts.

A method for producing a gas discharge light source for emitting an electromagnetic radiation according to U.S. Pat. No. 5,216,322 issued to Fuchs on Jun. 1, 1993 and entitled "Method of producing a gas discharge light source." The method includes a gas discharge tube filled with at least one discharge gas material and having a device for generating a gas discharge includes the following method steps: igniting the gas discharge tube filled with the discharge gas material, performing a forming operation in which the electrical operating power of the gas discharge light source is at least as high as the desired continuous operation power, holding the gas discharge tube at a temperature which is at least as high as the subsequent operating temperature, monitoring the intensity of the emitted electromagnetic radiation in the region of the desired wavelengths, and varying the partial pressure of the vaporized discharge gas material until the intensity of the selected electromagnetic radiation has reached a maximum value, whereupon a reservoir with excess discharge gas material is separated from the gas discharge tube in such a manner that the gas discharge tube under operating conditions does not contain any condensed discharge gas material. A gas discharge tube having a discharge material forming a discharge gas under operating conditions is distinguished in that the discharge gas material is incorporated in the inner wall of the gas discharge tube and there is no longer any condensed discharge gas material in the gas discharge tube.

U.S. Pat. No. 5,883,468 issued to Hobbs et al. on Mar. 16, 1999 and entitled "Tungsten halogen lamp with specific fill material, fill pressure, and filament coil parameters", refers to a long-life, two-filament tungsten halogen lamp having a light transmissive envelope, a first filament with a first lead, second lead, a filament coil, a second similar filament, and a fill material. The filament coil has an increased wire weight, increased over what is commonly used. The fill material comprises halogen for the tungsten halogen cycle, a getter, and the remainder is approximately equal portions of krypton and xenon. The basic life improvement comes from the heavier tungsten wire weight, combined with the heavier molecular weight of xenon and krypton. The new filament and fill gives a two-filament tungsten halogen lamp yielding substantially longer lamp life.

In the prior art, Ca/Na glass, borosilicate glass or glass ceramic is typically used as a transparent cover for lamps. The selection of the glass or of the glass ceramic is based on the respective thermal and mechanical requirements for the material.

Ca/Na glass is used in the form of thermally or chemically prestressed glass. Borosilicate glass is used if the maximum temperature to which the glass will be exposed is greater than 280° C., or if there is a large temperature gradient across the glass that can result in high stresses that can lead to breakage. Borosilicate glass can also be thermally prestressed. As a result of the thermal prestressing, the mechanical strength of the glass is increased as well as its ability to withstand temperature gradients. Thermally prestressed and non-prestressed borosilicate glass can withstand higher temperatures than chemically or thermally prestressed Ca/Na glass. For short periods of time, borosilicate glass can withstand maximum temperatures up to 500° C. The maximum temperature to which thermally prestressed soda-lime glass can be exposed, on the other hand, is approximately 350° C., because the prestress is reduced by high temperatures.

If a thermally prestressed glass is required, such as, for example, a safety glass that retains its properties even at maximum temperatures >350° C., then a thermally prestressed alumosilicate, or aluminosilicate, glass can meet this requirement. A glass ceramic is required for temperatures that are too high for both borosilicate glass and prestressed alumosilicate glass. This glass ceramic can be completely transparent or colored.

The surface of an alumosilicate glass that can be transformed into glass ceramic is structured and uneven on account of the rolling that it undergoes during the manufacturing process. The surface is similar to that of an orange peel. This macroscopic structure also contains small isolated holes or elevations that have a diameter of up to 0.5 mm. Dirt accumulates in the depressions as well as behind the elevations of the surface and is either difficult or impossible to remove mechanically. Mechanical cleaning using special cleaning scrapers and sponges is of only limited effectiveness in this application. Nevertheless, the best cleaning results are frequently achieved with a sponge and scraper. The surface structure of a rolled alumosilicate glass also influences the quality of a coating on this glass/glass ceramic, in that undesirable surface defects occur. To prevent this, the glass/glass ceramic can also be polished before coating, depending on the application. A smooth surface of a glass or of a glass ceramic can be achieved, for example, by grinding followed by polishing. Typically, the preliminary grinding is done with a grain size of approximately 100 $\mu$m. The preliminary grinding is followed by grinding with a grain size of 12–15 $\mu$m. The final polishing is done with an even finer grain size. A smooth surface can also be produced in the manner of the prior art by means of a coating, for example using $SnO_2$.

The methods described above for the production of a transparent cover that is resistant to high temperatures for the radiant source of lamps with a smooth surface, however, require additional steps after the manufacture of the glass/glass ceramic covering, which additional steps increase manufacturing costs.

OBJECT OF THE INVENTION

The object of the invention is to create a transparent cover made of alumosilicate glass for the radiant source of lamps, which has, without additional working steps, a smooth surface.

SUMMARY OF THE INVENTION

The invention teaches that this object can be accomplished by a transparent cover for the radiant source of lamps consisting of a glass object made of thermally prestressable alumosilicate float glass or a floated glass ceramic ceramized from it, which has a surface structure with a predetermined roughness.

The above-discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the exemplary embodiments illustrated in the accompanying figures.

DESCRIPTION OF THE PREFERRED EMBODIMENT

The cover claimed by the invention, which, depending on the thermal requirements, is made of alumosilicate float glass, and, where necessary, of thermally prestressed safety glass, or is made of floated glass ceramic made from an alumosilicate float glass, has a surface quality that is identical to that of a soda-lime float glass. As a result of the smooth surface that is formed during the floating and is retained during the ceramization, there is no need for additional polishing steps after the manufacture of the glass or of the glass ceramic. The surface is thereby easy-to-clean and is suitable for coating even without polishing.

The diffraction is lower and the cover is resistant to high temperatures.

The cover can be configured as planar glass/glass ceramic object or body, or in shaped configuration.

If the glass object contains a nucleation agent in the form of $TiO_2$, as explained below, the cover advantageously has integrated UV protection. Even without an additional filter, this UV radiation can not harm persons who spend significant amounts of time in the radiation range of the lamp.

The definitions of surface roughness are explained in greater detail in DIN 4762, among other sources. For example, the average roughness $R_a$ is the arithmetic mean, or average, of the absolute height differences from the center plane or the arithmetic average of the absolute amounts of the differences between the actual, or measured, profile and the average profile. This average profile is calculated by laying a profile through the measured profile within a reference length, so that the sum of the surface area of the measured profile filled with material on the top and the sum of the surface areas free of materials on the bottom are equal.

On the basis of DIN 4762, $R_q$=square average roughness, determined by means of white light interference microscopy (measurement area 0.6×0.5 mm). In terms of formulas, this concept is expressed as follows:

$$R_a = \frac{(|Z_1| + |Z_2| + |Z_3| + \ldots + |Z_n|)}{N}$$

$$R_q = \sqrt{\frac{(Z_1^2 + Z_2^2 + Z_3^2 + \ldots + Z_n^2)}{N}}$$

The manufacture of flat glass ceramic objects is described by the prior art.

Theoretically, all glass ceramics floated according to the methods of the prior art can be used for the manufacture of the easy-to-clean glass ceramic object claimed by the invention.

To achieve a particularly good surface quality and thus a correspondingly high ease of cleaning, the initial glass used for the glass ceramic is a thermally prestressable float glass that can be transformed into a glass ceramic with high quartz mixed crystals or keatite mixed crystals as the principal crystal phase, in which the origin of undesirable surface defects during the floating is prevented by restricting the concentrations of Pt to <300 ppb, Rh to <3.0 ppb, ZnO to <1.5 wt. % and $SnO_2$ to <1 wt. %, and by fining, or refining, the glass during the melting without using the conventional fining agents arsenic oxide or antimony oxide.

These types of glass are therefore characterized by a composition that makes it possible to prevent the formation of undesirable surface defects during floating. Floats conventionally consist of the melting chamber, or hot end, in which the glass is melted and fined, or refined, an interface that provides the transition from the oxide atmosphere in the melting chamber into the reducing atmosphere in the rest of the system, and the float portion, in which the glass is shaped by pouring it onto a molten metal, generally Sn, in a reducing atmosphere of forming gas. The glass is formed by allowing it to flow out smoothly onto the Sn bath and by top rollers that exert a force on the surface of the glass. During the transport on the metal bath, the glass cools, and, at the end of the float portion, it is lifted off and transferred into a cooling furnace, lehr, or annealing furnace/oven.

During the formation of the glass surface and the transport through the float, interactions between the glass and the float atmosphere or the Sn batch can result in undesirable surface defects.

If the glass contains more than 300 ppb Pt or more than 30 ppb Rh in dissolved form, metallic precipitations of Pt or Rh particles can form as a result of the reducing conditions in the glass surface, and these particles can serve as effective seeds for large high quartz, or beta quartz, mixed crystals up to 100 mm, and thus cause undesirable surface crystallization. These materials are used in, among other things, electrodes, linings, agitators, transport tubes, valve gates, etc. In plants for the performance of the method for the manufacture of the glass ceramic described above, to prevent the formation of surface crystals, therefore, components that contain Pt or Rh are completely avoided, and are replaced by ceramic materials, or the conditions in the melting chamber or in the interface are realized so that the above-mentioned concentrations are not exceeded.

The ZnO concentration is restricted to 1.5 wt. %. It has been shown that under the reducing conditions of the floating, the zinc is depleted in the surface of the glass. It is thereby assumed that the zinc is partly reduced on the surface of the glass, whereupon it vaporizes as a result of the higher vapor pressure of Zn compared to $Zn^{2+}$ in the float atmosphere. In addition to the evaporation and deposition of the Zn in colder spots, which are undesirable for the operation of the float, the uneven distribution of the Zn in the glass also participates in the origin of critical crystal bands close to the surface. These crystal bands of large high, or beta, quartz mixed crystals originate in the vicinity of the surface where the Zn concentration in the glass has risen back close to the initial value. It is therefore appropriate to keep the initial value low from the start.

The concentration of $SnO_2$ in the glass is restricted to less than 1 wt. %. As a result of the action of the reducing conditions in the float portion, the $SnO_2$ is partly reduced, especially in the surface of the glass. Surprisingly, small metal Sn spheres form in the glass in the immediate surface of the glass, and although they can easily be removed during cooling or cleaning, they leave behind spherical holes, or pits, depressions, that are extremely undesirable for the intended use of the glass.

These small spheres can be prevented if the concentration of $SnO_2$ is very low.

The above mentioned initial glasses are fined, or refined, without using the fining agents arsenic oxide and/or antimony oxide which are conventional for glass from the $Li_2O$—$Al_2O_3$—$SiO_2$ system. Under the action of the reducing conditions during floating, the above mentioned fining agents in particular are reduced directly on the surface of the glass and form undesirable and visible metallic coatings. The removal of these coatings, which are aesthetically and toxicologically undesirable, requires grinding and polishing and is disadvantageous for economic reasons. To prevent the formation of the coatings, it is therefore appropriate to achieve a low seed number, or number of seeds, number of bubbles, by adding at least one alternative chemical fining agent, such as $SnO_2$, $CeO_2$, sulfate compounds, chloride compounds, for example, preferably 0.2–0.6 wt. % $SnO_2$, to the molten glass. Alternatively, the molten glass can also be fined physically, e.g. by means of underpressure or by means of high temperature >1750° C. Thus the required seed quality, or number of bubbles, can be achieved by means of alternative fining agents and/or alternative fining methods.

During the ceramization, care must be taken to avoid any adverse effect on the low roughness values achieved by floating, for example by conducting the ceramization vertically or by an air-cushion ceramization, i.e. generally without any contact between the glass object being ceramized and a substrate.

Special advantages with regard to a very low surface roughness of the glass ceramic are achieved by a floated, ceramized aluminosilicate glass. The glass can be composed of, in wt. % on an oxide basis. $Li_2O$ in the range of 3.2–5.0 percent, which includes within the range percentages jn tenth of percent steps such that any tenth of a percent may be a limit of a diminished range. The glass is also composed of $Na_2O$ in the range of 0–1.5 percent, which includes within the range percentages in tenth of percent steps such that any tenth of a percent may be a limit of a diminished range. The glass is also composed of $K_2O$ in the range of 0–1.5 percent, which includes within the range percentages in tenth of percent steps such that any tenth of a percent may be a limit of a diminished range. The glass is also composed of $\Sigma Na_2O+K_2O$ in the range of 0.2–2.0 percent, which includes within the range percentages in tenth of percent steps such that any tenth of a percent may be a limit of a diminished range. The glass is also composed of MgO in the range of 0.1–2.2 percent, which includes within the range percentages in tenth of percent steps such that any tenth of a percent may be a limit of a diminished range. The glass is also composed of CaO in the range of 0–1.5 percent which includes within the range percentages in tenth of percent steps such that any tenth of a percent may be a limit of a diminished range. The glass is also composed of SrO in the range of 0–1.5 percent, which includes within the range percentages in tenth of percent steps such that any tenth of a percent may be a limit of a diminished range. The glass also is composed of BaO in the range of 0–2.5 percent which includes within the range percentages in tenth of percent steps such that any tenth of a percent may be a limit of a diminished range. The glass is also composed of ZnO in the range of 0–<1.5 percent, which includes within the range percentages in tenth of percent steps such that any tenth of a percent may be a limit of a diminished range. The glass is also composed of $Al_2O_3$ in the range of 19–25 percent, which includes within the range percentages in tenth of percent steps such that any tenth of a percent may be a limit of a diminished range. The glass is also composed of $SiO_2$ in the range of 55–69 percent, which includes within the range percentages in tenth of percent steps such that any tenth of a percent may be a limit of a diminished range. The glass is also composed of $TiO_2$ in the range of 1.0–5.0 percent which includes within the range percentages in tenth of percent steps such that any tenth of a percent may be a limit of a diminished range. The glass is also composed of $ZrO_2$ in the range of 1.0–2.5 percent, which includes within the range percentages in tenth of percent steps such that any tenth of a percent may be a limit of a diminished range. The glass is also composed of $SnO_2$ in the range of 0–<1.0 percent which includes within the range percentages in tenth of percent steps such that any tenth of a percent may be a limit of a diminished range. The glass is also composed of $\Sigma TiO_2+ZrO_2+SnO_2$ in the range of 2.5–5.0 percent, which includes within the range percentages in tenth of percent steps such that any tenth of a percent may be a limit of a diminished range. The glass is also composed of $P_2O_5$ in the range of 0–3.0 percent, which includes within the range percentages in tenth of percent steps such that any tenth of a percent may be a limit of a diminished range.

In a second embodiment, the glass in one particularly preferred embodiment can be composed of, in wt. % on an oxide basis, $Li_2O$ in the range of 3.5–4.5 percent, which includes within the range percentages in tenth of percent steps such that any tenth of a percent may be a limit of a diminished range. The glass is also composed of $Na_2O$ in the range of 0.2–1.0 percent, which includes within the range percentages in tenth of percent steps such that any tenth of a percent may be a limit of a diminished range. The glass is also composed of $K_2O$ in the range of 0–0.8 percent, which includes within the range percentages in tenth of percent steps such that any tenth of a percent may be a limit of a diminished range. The glass is also composed of $\Sigma Na_2O + K_2O$ in the range of 0.4–1.5 percent, which includes within the range percentages in tenth of percent steps such that any tenth of a percent may be a limit of a diminished range. The glass is also composed of MgO in the range of 0.3–2.0 percent, which includes within the range percentages in tenth of percent steps such that any tenth of a percent may be a limit of a diminished range. The glass is also composed of CaO in the range of 0–1.0 percent, which includes within the range percentages in tenth of percent steps such that any tenth of a percent may be a limit of a diminished range. The glass is also composed of SrO in the range of 0–1.0 percent, which includes within the range percentages in tenth of percent steps such that any tenth of a percent may be a limit of a diminished range. The glass is also composed of BaO in the range of 0–2.5 percent, which includes within the range percentages in tenth of percent steps such that any tenth of a percent may be a limit of a diminished range. The glass is also composed of ZnO in the range of 0–1.0 percent which includes within the range percentages in tenth of percent steps such that any tenth of a percent may be a limit of a diminished range. The glass is also composed of $Al_2O_3$ in the range of 19–24 percent, which includes within the range percentages in tenth of percent steps such that any tenth of a percent may be a limit of a diminished range. The glass is also composed of $SiO_2$ in the range of 60–68 percent which includes within the range percentages in tenth of percent steps such that any tenth of a percent may be a limit of a diminished range. The glass is also composed of $TiO_2$ in the range of 1.0–2.0 percent, which includes within the range percentages in tenth of percent steps such that any tenth of a percent may be a limit of a diminished range. The glass is also composed of $ZrO_2$ in the range of 1.2–2.2 percent which includes within the range percentages in tenth of percent steps such that any tenth of a percent may be a limit of a diminished range. The glass is also composed of $SnO_2$ in the range of 0–0.6 percent, which includes within the range percentages in tenth of percent steps such that any tenth of a percent may be a limit of a diminished range. The glass is also composed of $\Sigma TiO_2+ZrO_2+SnO_2$ in the range of 3.0–4.5 percent, which includes within the range percentages in tenth of percent steps such that any tenth of a percent may be a limit of a diminished range. The glass is also composed of $P_2O_5$ in the range of 0–2.0 percent, which includes within the range percentages in tenth of percent steps such that any tenth of a percent may be a limit of a diminished range.

This glass is used with particular advantage for the manufacture of the glass ceramic object claimed by the invention, because the corresponding surface is very easy-to-clean.

One feature of the invention resides broadly in the transparent cover for the radiant source of lamps consisting of a glass object made of thermally prestressable alumosilicate float glass or a floated glass ceramic ceramized from it, which has a surface structure with a roughness determined by the average roughness $R_a \leq 0.02$ μm and/or the square average roughness $R_q \leq 0.01$ μm.

Another feature of the invention resides broadly in the cover manufactured from an initial glass that can be floated, thermally prestressed and transformed into a glass ceramic with high quartz mixed crystals or keatite mixed crystals that has a content of less than 300 ppb Pt, less than 30 ppb Rh, less than 1.5 wt. % ZnO and less than 1 wt. % $SnO_2$, that is fined during melting without the use of the conventional fining agents arsenic oxide and/or antimony oxide, and that has been formed by being poured onto a molten metal in a reducing atmosphere.

Yet another feature resides broadly in the cover with a floated alumosilicate glass as the initial glass.

Still another feature of the invention resides broadly in the cover characterized by a composition of the initial glass. The glass can be composed of, (in wt. % on an oxide basis) $Li_2O$ in the range of 3.2–5.0 percent, which includes within the range percentages in tenth of percent steps such that any tenth of a percent may be a limit of a diminished range. The glass is also composed of $Na_2O$ in the range of 0–1.5 percent which includes within the range percentages in tenth of percent steps such that any tenth of a percent may be a limit of a diminished range. The glass is also composed of K$_2$O in the range of 0–1.5 percent, which includes within the range percentages in tenth of percent steps such that any tenth of a percent may be a limit of a diminished range. The glass is also composed of ΣNa$_2$O+K$_2$O in the range of 0.2–2.0 percent which includes within the range percentages in tenth of percent steps such that any tenth of a percent may be a limit of a diminished range. The glass is also composed of MgO in the range of 0.1–2.2 percent, which includes within the range percentages in tenth of percent steps such that any tenth of a percent may be a limit of a diminished range. The glass is also composed of CaO in the range of 0–1.5 percent which includes within the range percentages in tenth of percent steps such that any tenth of a percent may be a limit of a diminished range. The glass is also composed of SrO in the range of 0–1.5 percent, which includes within the range percentages in tenth of percent steps such that any tenth of a percent may be a limit of a diminished range. The glass is also composed of BaO in the range of 0–2.5 percent, which includes within the range percentages in tenth of percent steps such that any tenth of a percent may be a limit of a diminished range. The glass is also composed of ZnO in the range of 0-<1.5 percent, which includes within the range percentages in tenth of percent steps such that any tenth of a percent may be a limit of a diminished range. The glass is also composed of Al$_2$O$_3$ in the range of 19–25 percent which includes within the range percentages in tenth of percent steps such that any tenth of a percent may be a limit of a diminished range. The glass is also composed of SiO$_2$ in the range of 55–69 percent, which includes within the range percentages in tenth of percent steps such that any tenth of a percent may be a limit of a diminished range. The glass is also composed of TiO$_2$ in the range of 1.0–5.0 percent which includes within the range percentages in tenth of percent steps such that any tenth of a percent may be a limit of a diminished range. The glass is also composed of ZrO$_2$ in the range of 1.0–2.5 percent, which includes within the range percentages in tenth of percent steps such that any tenth of a percent may be a limit of a diminished range. The glass is also composed of SnO$_2$ in the range of 0-<1.0 percent which includes within the range percentages in tenth of percent steps such that any tenth of a percent may be a limit of a diminished range. The glass is also composed of ΣTiO$_2$+ZrO$_2$+SnO$_2$ in the range of 2.5–5.0 percent, which includes within the range percentages in tenth of percent steps such that any tenth of a percent may be a limit of a diminished range. The glass is also composed of P$_2$O$_5$ in the range of 0–3.0 percent, which includes within the range percentages in tenth of percent steps such that any tenth of a percent may be a limit of a diminished range, with the optional addition of coloring components such as V, Cr, Mn, Fe, Co, Cu, Ni, Se and/or Cl compounds.

A further feature of the invention resides broadly in the cover characterized by a composition. The composition can be composed of, in wt. % on an oxide basis, Li$_2$O in the range of 3.5–4.5 percent, which includes within the range percentages in tenth of percent steps such that any tenth of a percent may be a limit of a diminished range. The composition is also composed of Na$_2$O in the range of 0.2–1.0 percent, which includes within the range percentages in tenth of percent steps such that any tenth of a percent may be a limit of a diminished range. The composition is also composed of K$_2$O in the range of 0–0.8 percent, which includes within the range percentages in tenth of percent steps such that any tenth of a percent may be a limit of a diminished range. The composition is also composed of ΣNa$_2$O+K$_2$O in the range of 0.4–1.5 percent, which includes within the range percentages in tenth of percent steps such that any tenth of a percent may be a limit of a diminished range. The composition is also composed of MgO in the range of 0.3–2.0 percent which includes within the range percentages in tenth of percent steps such that any tenth of a percent may be a limit of a diminished range. The composition is also composed of CaO in the range of 0–1.0 percent, which includes within the range percentages in tenth of percent steps such that any tenth of a percent may be a limit of a diminished range. The composition is also composed of SrO in the range of 0–1.0 percent, which includes within the range percentages in tenth of percent steps such that any tenth of a percent may be a limit of a diminished range. The composition is also composed of BaO in the range of 0–2.5 percent, which includes within the range percentages in tenth of percent steps such that any tenth of a percent may be a limit of a diminished range. The composition also is composed of ZnO in the range of 0–1.0 percent, which includes within the range percentages in tenth of percent steps such that any tenth of a percent may be a limit of a diminished range. The composition is also composed of Al$_2$O$_3$ in the range of 19–24 percent which includes within the range percentages in tenth of percent steps such that any tenth of a percent may be a limit of a diminished range. The composition is also composed of SiO$_2$ in the range of 60–68 percent, which includes within the range percentages in tenth of percent steps such that any tenth of a percent may be a limit of a diminished range. The composition is also composed of TiO$_2$ in the range of 1.0–2.0 percent, which includes within the range percentages in tenth of percent steps such that any tenth of a percent may be a limit of a diminished range. The composition is also composed of ZrO$_2$ in the range of 1.2–2.2 percent which includes within the range percentages in tenth of percent steps such that any tenth of a percent may be a limit of a diminished range. The composition is also composed of SnO$_2$ in the range of 0–0.6 percent, which includes within the range percentages in tenth of percent steps such that any tenth of a percent may be a limit of a diminished range. The composition is also composed of ΣTiO$_2$+ZrO$_2$+SnO$_2$ in the range of 3.0–4.5 percent, which includes within the range percentages in tenth of percent steps such that any tenth of a percent may be a limit of a diminished range. The composition is also composed of P$_2$O$_5$ in the range of 0–2.0 percent which includes within the range percentages in tenth of percent steps such that any tenth of a percent may be a limit of a diminished range, with the optional addition of coloring components such as V, Cr, Mn, Fe, Co, Cu, Ni, Se and/or Cl compounds.

Another feature of the invention resides broadly in the cover characterized by the fact that for the initial glass, to avoid the formation of a damaging crystal band near the surface during floating, the expression (in wt. %): 3.2×ZnO+ TiO$_2$≦4.3 is valid.

Yet another feature of the invention resides broadly in the cover characterized by contents of less than 200 ppb Fe$_2$O$_3$ and less than 2.5 wt. % TiO$_2$ in the initial glass, to counteract an undesired coloration, or discoloration, in the vitrified state and to achieve a light transmittance of >89% and preferably >90% at a thickness of 4 mm.

Still another feature of the invention resides broadly in the cover characterized by the fact that the initial glass is technically, or industrially, free of BaO.

A further feature of the invention resides broadly in the cover characterized by a coefficient of thermal expansion $a_{20/300}$ between 3.5 and 5.0×10$^{-6}$/K, a transformation temperature Tg between 600 and 750° C. and a processing temperature V$_A$ of the glass ceramic below 1350° C.

Another feature of the invention resides broadly in the cover characterized by a coefficient of thermal expansion of the glass ceramic with keatite mixed crystals as the predominant crystal phase of less than $1.5 \times 10^{-6}$/K.

Yet another feature of the invention resides broadly in the cover characterized by a coefficient of thermal expansion of the glass ceramic with high quartz mixed crystals as the predominant phase of $(0 \pm 0.3) \times 10^{-6}$/K, preferably $(0 \pm 0.15) \times 10^{-6}$/K and a light transmittance of >80%.

Still another feature of the invention resides broadly in the cover characterized by the fact that to achieve a low number of bubbles, at least one alternative chemical fining agent, e.g. $SnO_2$, $CeO_2$, sulfate compounds and/or chloride compounds, preferably 0.2–0.6 wt. % $SnO_2$, is added to the glass melt.

A further feature of the invention resides broadly in the cover characterized by the fact that to achieve a low number of bubbles, the glass melt is physically fined, e.g. by means of underpressure or by means of high temperature >1750° C.

In accordance with one aspect of the invention there is provided a lamp with an unpolished surface, said lamp comprising: a support structure; said support structure comprising a base end and a lamp support end; a closed body; said closed body being operatively connected to said lamp support end of said support structure; said closed body comprising a source of light adapted to be connected to a source of power; contacts to connect said source of light to a source of power; and a cover; said cover being configured and disposed to permit light to exit said lamp when connected to a source of power; said cover to permit light to exit said lamp comprising an inner surface facing the interior of said lamp and an outer surface facing away from said lamp; at least said outer surface facing away from said lamp comprising unpolished glass being configured to provide said unpolished surface; said glass being substantially free of pits and pores; and said glass being configured to have a surface roughness which is minimized to thus provide said outer surface.

Figure 1:
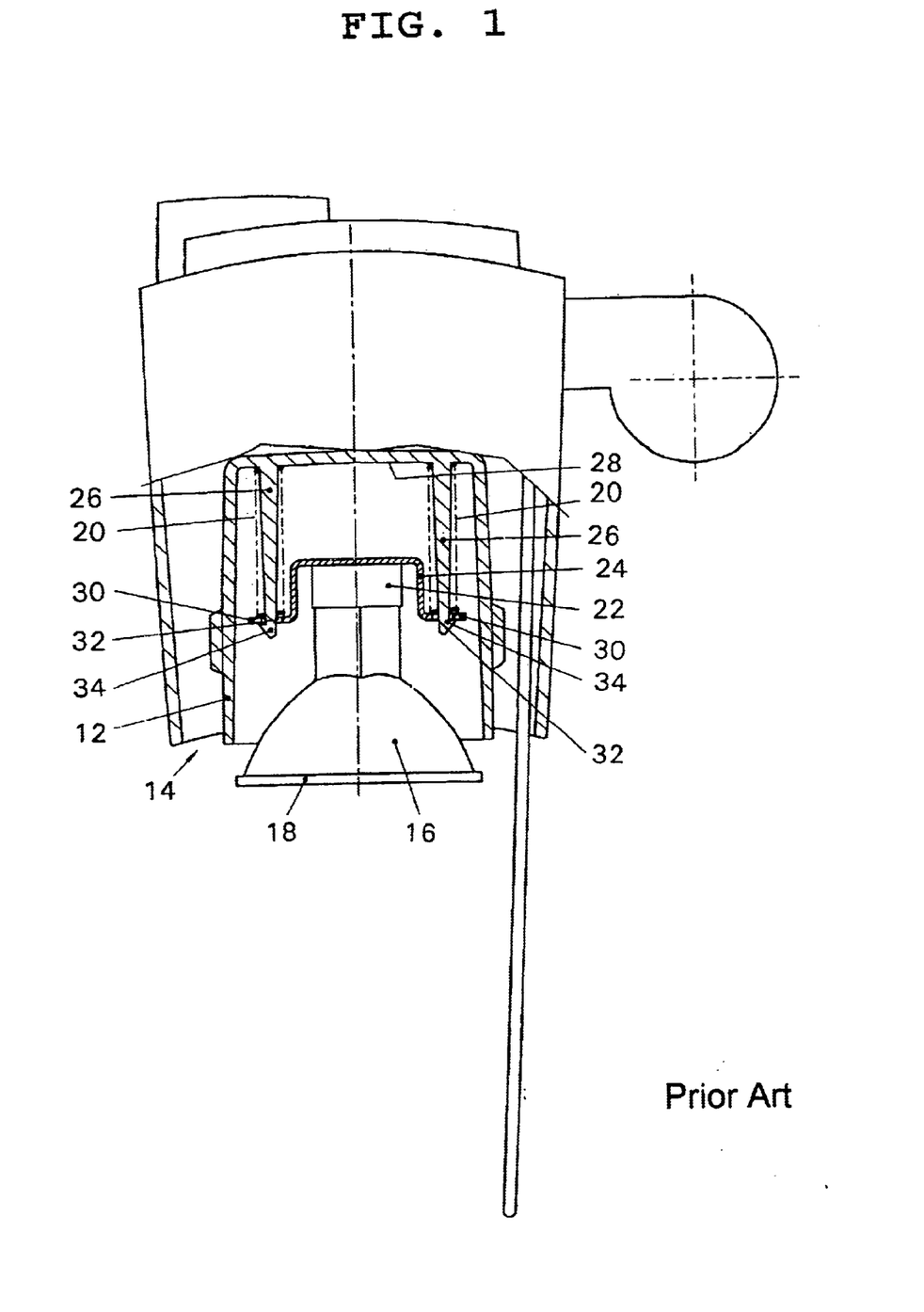
FIG. 1 is an elevational view of a halogen lamp assembly with a transparent cover forming part of the halogen lamp.

Turning now to the drawing figures, FIG. 1 is a copy of the FIG. 3 from U.S. Pat. No. 6,183,113 B1 issued to Waldmann on Feb. 16, 2001 and entitled "Halogen lamp", from which figure copy all of the reference numerals present in the original figure, as it appears in U.S. Pat. No. 6,183,113 B1 have been removed. U.S. Pat. No. 6,183,113 B1 is hereby incorporated by reference as if set forth in its entirety. The reference numerals that have been removed from the FIG. 3 for this U.S. patent, essentially reproduced herein as FIG. 1, indicate arrangements that are well known in the prior art.

In one possible embodiment of the present invention, illustrated in FIG. 1, the present invention is shown with a halogen lamp assembly comprising a housing 12 having a light exit opening 14 and a halogen bulb 16 in the housing 12. The halogen bulb 16 comprises a transparent cover 18.

The halogen bulb 16 is supported so that it can slide axially in the housing 12 against the force of springs 20 biasing the halogen bulb 16 in the direction of the light exit opening 14. Seating of the halogen bulb 16 is achieved by pushing the halogen bulb 16 against the force of the springs 20 into a rear position inside the housing 12, and the halogen bulb 16) is pushed by said springs 20 into a forward position by removal of a clamping ring, not shown. A socket 22 holds the halogen bulb 16 attached to a socket clip 24. Two pins 26 are provided in the interior of housing 12, with at least one pin 26 being surrounded by a helical spring 20, which spring is held between a rear housing stop 28 and the rear surface of the socket clip 24.

There are also provided lateral arms 30 at the socket clip 24, each of which lateral arms 30 has an opening 32 which slides over a pin 26.

The forward-most position of the halogen bulb 16 as shown in FIG. 1 is defined by hook-shaped stops 34 at the forward end of pins 26. The two arms 30 thus come to rest against these stops 34.

Figure 2:
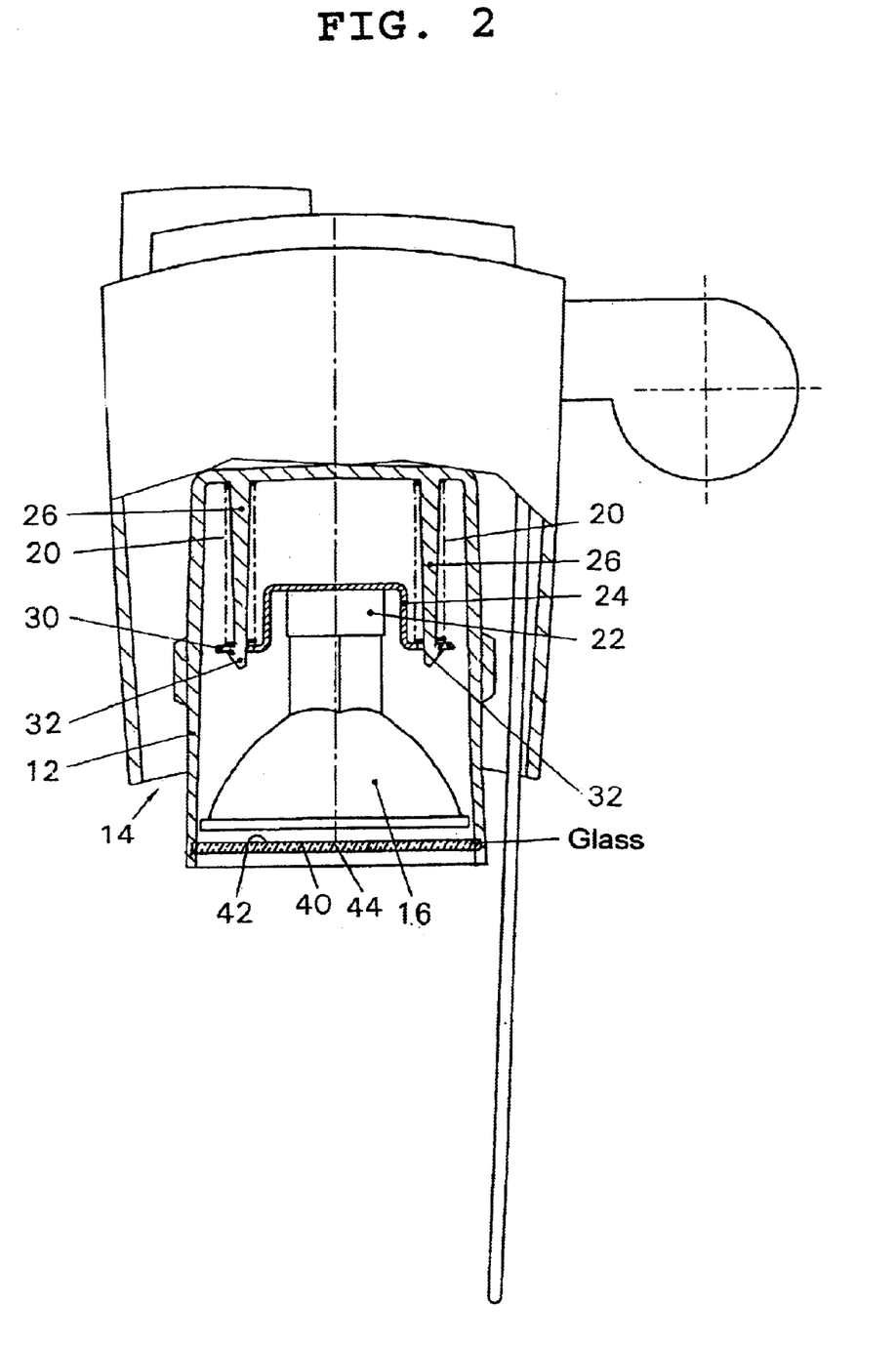
FIG. 2 is an elevational view similar to FIG. 1 with a separate transparent cover.

FIG. 2 is also based on the FIG. 3 of U.S. Pat. No. 6,183,113 B1 and illustrates an embodiment of the present invention in which a transparent cover 40 is disposed in the housing 12.

This cover 40 comprises a cover to permit light to exit the lamp and has an inner surface 42 facing the halogen bulb 16 and comprises an outer surface 44 facing away from the halogen bulb 16. At least the outer surface 44 facing away from the halogen bulb 16 of cover 40 comprises unpolished glass that is being configured to provide an easy-to-clean, unpolished surface.

The cover 40 in accordance with this embodiment comprises unpolished glass with at least one surface, for example, surface 44, comprises a surface having a roughness which is minimized to provide the easy-to-clean surface.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication application, namely, Federal Republic of Germany Patent Application No. DE 100 17 696.8-33, filed on Apr. 8, 2000, having inventors Dr. Sabine MELSON, Dr. Peter NASS, entitled "Transparente Abdeckung der Strahlungsquelle von Lampen," and DE-OS 100 17 696.8-33 and DE-PS 100 17 696.8-33, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Another foreign patent publication application, namely, Federal Republic of Germany Patent Application No. DE 100 17 698.4-45, filed on Apr. 8, 2000, having inventors Dr. Sabine MELSON, Dr. K. SCHAUPERT, and Dr. Peter NASS, entitled, "Reinigungsfreundlicher Glaskeramikkörper," and DE-OS 100 17 698.4-45 and DE-PS 100 17 698.4-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Yet another foreign patent publication application, namely, Federal Republic of Germany Patent Application No. DE 100 17 701.8-45, filed on Apr. 8, 2000, having inventors Dr. Friedrich SIEBERS, Dr. Peter NASS, Dr. Gerhard LAUTENSCHLAGER, and Dr. Otmar BECKER, entitled "Glas sowie Verfahren zu seiner Herstellung und Verwendung desselben," and DE-OS 100 17 701.8-45 and DE-PS 100 17 701.8-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

A further foreign patent publication application, namely, Federal Republic of Germany Patent Application No. DE 100 17 699.2-45, filed on Apr. 8, 2000, having inventors Dr. Sabine MELSON and Stefan HUBERT, entitled, "Verglasung von Räumen, die einem extrem hohen Temperaturgradienten ausgesetzt sind," and DE-OS 100 17 699.2-45 and DE-PS 100 17 699.2-45, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

U.S. patent application Ser. No. 09/828,288, having attorney docket No. NHL-FMW-01 US (SCT), having inventors Dr. Sabine MELSON, Dr. K. SCHAUPERT, and Dr. Peter NASS, filed on Apr. 6, 2001, entitled, "A COOKING ARRANGEMENT FOR COOKING FOOD SUCH AS A STOVE, A COOKTOP, AND OTHER COOKING APPLIANCES, WITH AN EASY-TO-CLEAN SURFACE" is hereby incorporated by reference as if set forth in its entirety herein.

U.S. patent application Ser. No. 09/828,277, having attorney docket No. NHL-FMW-02 US (SCT), having inventors Dr. Friedrich SIEBERS, Dr. Peter NASS, Dr. Gerhard LAUTENSCHLÄGER, and Dr. Otmar BECKER, filed on Apr. 6, 2001, entitled "FLAT FLOAT GLASS" is hereby incorporated by reference as if set forth in its entirety herein.

U.S. patent application Ser. No. 09/828,287, having attorney docket No. NHL-FMW-03 US (SCT), having inventors Dr. Sabine MELSON and Stefan HUBERT, filed on Apr. 6, 2001, entitled, "A BUILDING FOR CONTAINING HUMAN OCCUPANTS IN AN ADVERSE ARCTIC OR ANTARCTIC ENVIRONMENT AND STRUCTURES FOR CONTAINING AND PROTECTING OCCUPANTS IN AN ADVERSE ENVIRONMENT" is hereby incorporated by reference as if set forth in its entirety herein.

The term DIN refers to the standards of the German Standards Association, Deutsches Institut für Normung.

The expression thermal expansion coefficient or coefficient of thermal expansion ($\alpha_{20/300}$) in at least one embodiment of the invention is to mean: a thermal coefficient ($\alpha$) as possibly nominally applicable in the temperature range of nominal from about 20 to about 300 (in the Celsius and/or Kelvin scale, as possibly applicable) in the context of the indicated data.

The expression glass transition temperature or transformation temperature ($T_g$) in at least one embodiment of the invention is to mean: (1) the temperature below which a substance becomes superconducting; or (2) the temperature at which one polymorph changes into the next thermodynamically stable state; as the shown technical data suggest.

Special advantages with regard to a very low surface roughness of the glass ceramic are achieved by a glass. The glass can be composed of, in wt. % on an oxide basis $Li_2O$ in the range of three point two to five point zero percent, which includes within the range percentages in tenth of percent steps such that any tenth of a percent may be a limit of a diminished range. The glass is also composed of $Na_2O$ in the range of zero to one point five percent, which includes within the range percentages in tenth of percent steps such that any tenth of a percent may be a limit of a diminished range. The glass is also composed of $K_2O$ in the range of zero to one point five percent, which includes within the range percentages in tenth of percent steps such that any tenth of a percent may be a limit of a diminished range. The glass is also composed of $\Sigma Na_2O + K_2O$ in the range of point two to two point zero percent, which includes within the range percentages in tenth of percent steps such that any tenth of a percent may be a limit of a diminished range. The glass is also composed of MgO in the range of point one to two point two percent, which includes within the range percentages in tenth of percent steps such that any tenth of a percent may be a limit of a diminished range. The glass is also composed of CaO in the range of zero to one point five percent, which includes within the range percentages in tenth of percent steps such that any tenth of a percent may be a limit of a diminished range. The glass is also composed of SrO in the range of zero to one point five percent, which includes within the range percentages in tenth of percent steps such that any tenth of a percent may be a limit of a diminished range. The glass is also composed of BaO in the range of zero to two point five percent, which includes within the range percentages in tenth of percent steps such that any tenth of a percent may be a limit of a diminished range. The glass is also composed of ZnO in the range of zero to less than one point five percent, which includes within the range percentages in tenth of percent steps such that any tenth of a percent may be a limit of a diminished range. The glass is also composed of $Al_2O_3$ in the range of nineteen to twenty-five percent, which includes within the range percentages in tenth of percent steps such that any tenth of a percent may be a limit of a diminished range. The glass is also composed of $SiO_2$ in the range of fifty-five to sixty-nine percent, which includes within the range percentages in tenth of percent steps such that any tenth of a percent may be a limit of a diminished range. The glass is also composed of $TiO_2$ in the range of one point zero to five point zero percent, which includes within the range percentages in tenth of percent steps such that any tenth of a percent may be a limit of a diminished range. The glass is also composed of $ZrO_2$ in the range of one point zero to two point five percent, which includes within the range percentages in tenth of percent steps such that any tenth of a percent may be a limit of a diminished range. The glass is also composed of $SnO_2$ in the range of zero to less than one point zero percent, which includes and within the range percentages in tenth of percent steps such that any tenth of a percent may be a limit of a diminished range. The glass is also composed of $\Sigma TiO_2 + ZrO_2 + SnO_2$ in the range of two point five to five point zero percent, which includes within the range percentages in tenth of percent steps such that any tenth of a percent may be a limit of a diminished. The glass is also composed of $P_2O_5$ in a range of zero to three point zero percent, which includes within the range percentages in tenth of percent steps such that any tenth of a percent may be a limit of a diminished range.

In a second possible embodiment, the glass has a composition. The composition can be composed of in wt. % on an oxide basis, $Li_2O$ in the range of three point five to four point five percent, which includes within the range percentages in tenth of percent steps such that any tenth of a percent may be a limit of a diminished range. The composition is also composed of $Na_2O$ in the range of point two to one point zero percent, which includes within the range percentages in tenth of percent steps such that any tenth of a percent may be a limit of a diminished range. The composition is also composed of $K_2O$ in the range of zero to point eight percent, which includes within the range percentages in tenth of percent steps such that any tenth of a percent may be a limit of a diminished range. The composition is also composed of $\Sigma Na_2O+K_2O$ in the range of point four to one point five percent, which includes within the range percentages in tenth of percent steps such that any tenth of a percent may be a limit of a diminished range. The composition is also composed of MgO in the range of point three to two point zero percent, which includes within the range percentages in tenth of percent steps such that any tenth of a percent may be a limit of a diminished range. The composition is also composed of CaO in the range of zero to one point zero percent, which includes within the range percentages in tenth of percent steps such that any tenth of a percent may be a limit of a diminished range. The composition is also composed of SrO in the range of zero to one point zero percent, which includes within the range percentages in tenth of percent steps such that any tenth of a percent may be a limit of a diminished range. The composition is also composed of BaO in the range of zero to two point five percent, which includes within the range percentages in tenth of percent steps such that any tenth of a percent may be a limit of a diminished range. The composition is also composed of ZnO in the range of zero to one point zero percent, which includes within the range percentages in tenth of percent steps such that any tenth of a percent may be a limit of a diminished range. The composition is also composed of $Al_2O_3$ in the range of nineteen to twenty-four percent, which includes within the range percentages in tenth of percent steps such that any tenth of a percent may be a limit of a diminished range. The composition is also composed of $SiO_2$ in the range of sixty to sixty-eight percent, which includes within the range percentages in tenth of percent steps such that any tenth of a percent may be a limit of a diminished range. The composition is also composed of $TiO_2$ in the range of one point zero to two point zero percent, which includes within the range percentages in tenth of percent steps such that any tenth of a percent may be a limit of a diminished range. The composition is also composed of $ZrO_2$ in the range of one point two to two point two percent, which includes within the range percentages in tenth of percent steps such that any tenth of a percent may be a limit of a diminished range. The composition is also composed of $SnO_2$ in the range of zero to point six percent, which includes within the range percentages in tenth of percent steps such that any tenth of a percent may be a limit of a diminished range. The composition is also composed of $\Sigma TiO_2+ZrO_2+SnO_2$ in the range of three point zero to four point five percent, which includes within the range percentages in tenth of percent steps such that any tenth of a percent may be a limit of a diminished range. The composition is also composed of $P_2O_5$ in the range of zero to two point zero percent, which includes within the range percentages in tenth of percent steps such that any tenth of a percent may be a limit of a diminished range.

In other words, the glass composition of the cover in accordance with the present invention may comprise, in weight percent based on oxide, lithium oxide ($Li_2O$) in the range of from 3.2 percent to 5.0 percent; sodium oxide ($Na_2O$) from 0 percent to 1.5 percent; potassium oxide ($K_2O$) from 0 percent to 1.5 percent; sodium oxide ($Na_2O$)+ potassium oxide ($K_2O$) in the range of from 0.2 percent to 2.0 percent; magnesium oxide (MgO) in the range of from 0.1 percent to 2.2 percent; calcium oxide (CaO) in the range of from 0 percent to 1.5 percent; strontium oxide (SrO) in the range of from 0 percent to 1.5 percent; barium oxide (BaO) in the range of from 0 percent to 2.5 percent; zinc oxide (ZnO) in the range of from 0 percent to less than 1.5 percent; aluminium oxide ($Al_2O_3$) in the range of from 19 percent to 25 percent; silicon dioxide ($SiO_2$) in the range of from 55 percent to 69 percent; titanium dioxide (TiO2) in the range of from 1.0 percent to 5.0 percent; zirconium dioxide ($ZrO_2$) in the range of from 1.0 percent to 2.5 percenter; tin dioxide ($SnO_2$)in the range of from 0 percent to less than 1.0 percent; titanium dioxide ($TiO_2$)+zirconium ($ZrO_2$)+tin dioxide ($SnO_2$) in the range of from 2.5 percent to 5.0 percent; phosphoric oxide ($P_2O_5$) in the range of from 0 percent to 3.0 percent. Of course, there may be present coloring agents from the group comprising compounds of: vanadium (V), chromium (Cr), manganese (Mn), iron (Fe), cobalt (Co), copper (Cu), nickel (Ni), selenium (Se) and/or chlorine (Cl).

Some examples of flat glass production which may possibly be incorporated in an example of the present invention may be found in U.S. Pat. No. 3,218,143 issued to De Lajarte on Nov. 16, 1965 and entitled "Process for the manufacture of flat glass"; U.S. Pat. No. 3,930,826 issued to Schornhorst on Jan. 6, 1976 and entitled "Conditioning flat glass for removal from supporting liquid following forming"; U.S. Pat. No. 3,938,979 issued to Plumat on Feb. 147, 1976 and entitled "Method and apparatus for vertically drawing a glass ribbon"; U.S. Pat. No. 4,801,321 issued to Pita et al. on Jan. 31, 1989 and entitled "Method for the manufacturing of glass sheets"; U.S. Pat. No. 4,214,886 issued to Shay et al. on Jul. 29, 1980 and entitled "Forming laminated sheet glass"; U.S. Pat. No. 4,209,315 issued to Spurling on Jun. 24, 1980 and entitled "Glass forming apparatus"; U.S. Pat. No. 4,929,266 issued to Cozac et al. on May 29, 1990 and entitled "Method of manufacturing glass"; and U.S. Pat. No. 5,078,777 issued to Cozac et al. on Jan. 7, 1992 and entitled "Glass-melting furnace", all of these U.S. patents being hereby expressly incorporated by reference as if set forth in their entirety herein.

Some examples relating to aluminosilicate, features of which may possibly be incorporated in an embodiment of the present invention may be found in U.S. Pat. No. 4,084,974 issued to Beall et al. on Apr. 18, 1978 and entitled "Method of making light-absorbing glass-ceramic articles"; U.S. Pat. No. 4,530,909 issued to Makishima et al. on Jul. 23, 1985 and entitled "Aluminosilicate glass containing $Y_2O_3$ concentrate and $ZRO_2$"; U.S. Pat. No. 4,626,515 issued to Chyung et al. on Dec. 2, 1986 and entitled "Reinforced alkaline earth aluminosilicate glasses"; U.S. Pat. No. 4,846,866 issued to Chyung et al. on Jul. 11, 1989 and entitled "Providing reinforced alkaline earth aluminosilicate glasses"; and U.S. Pat. No. 6,060,168 issued to Kohli on May 9, 2000 and entitled "Glasses for display panels and photovoltaic devices", all of these U.S. patents being hereby expressly incorporated by reference as if set forth in their entirety herein.

Some examples relating to methods of making halogen lamp bulbs and relating to halogen lamp bulbs, features of which may possibly be incorporated in an embodiment of the present invention may be found in U.S. Pat. No. 4,140,939 issued to Bonazoli et al. on Feb. 20, 1979 and entitled "Tungsten halogen lamp for headlights"; U.S. Pat. No. 4,319,156 issued to Bienvenue et al. on Mar. 9, 1982 and entitled "Vehicle headlight having dual filament tungsten halogen lamp"; U.S. Pat. No. 4,339,685 issued to Saguchi et al. on Jul. 13, 1982 and entitled "Sealed beam lamp assembly"; U.S. Pat. No. 4,342,142 issued to Nieda et al. on Aug. 3, 1982 and entitled "Method for manufacturing sealed-beam type electric bulb"; U.S. Pat. No. 4,540,911 issued to Arai et al. on Sep. 10, 1985 and entitled "Halogen lamp unit"; U.S. Pat. No. 4,607,016 issued to Danielson et al. on Aug. 19, 1986 and entitled "Glass for use as tungsten-halogen lamp envelopes"; U.S. Pat. No. 4,801,845 issued to Kiesel on Jan. 31, 1989 and entitled "Halogen incandescent lamp structure"; U.S. Pat. No. 5,513,08 issued to Ho on Apr. 30, 1996 and entitled "Ultraviolet-reduced halogen lamp"; U.S. Pat. No. 5,850,124 issued to Hasegawa et al. on Dec. 15, 1998 and entitled "Automobile lamp bulb with welded low beam shield"; U.S. Pat. No. 5,855,430 issued to Coushaine et al. on Jan. 5, 1999 and entitled "Vehicle headlamp assembly"; U.S. Pat. No. 5,949,181 issued to Tabata et al. on Sep. 7, 1999 and entitled "Automotive lamp bulb with alignment bead"; U.S. Pat. No. 5,984,750 issued to Nishibori et al. on Nov. 16, 1999 and entitled "Method of sealing halogen lamp"; and U.S. Pat. No. 6,183,113 B1 issued to Waldmann on Feb. 6, 2001 and entitled "Halogen lamp", all of these U.S. patents being hereby expressly incorporated by reference as if set forth in their entirety herein.

Some examples relating to float glass processes, features of which may possibly be incorporated in an embodiment of the present invention may be found in U.S. Pat. No. 4,305,745 issued to Mouly on Dec. 15, 1981 and entitled "Method of attenuating glass in a float process"; U.S. Pat. No. 4,342,583 issued to Kapura et al. on Aug. 3, 1982 and entitled "Apparatus and method for attenuating floating glass ribbon"; U.S. Pat. No. 4,357,156 issued to Seymour on Nov. 2, 1982 and entitled "Minimizing surface distortion while shaping glass sheets"; U.S. Pat. No. 4,402,722 issued to Edge on Sep. 6, 1983 and entitled "Cooling arrangement and method for forming float glass"; U.S. Pat. No. 4,741,7540 issued to Bricker on May 3, 1988 and entitled "Method an apparatus for cooling in a float glass forming operation"; and U.S. Pat. No. 5,643,349 issued to Piper et al on Jul. 1, 1997 and entitled "Apparatus for applying $SO_3$ to float glass", all of these U.S. patents being hereby expressly incorporated by reference as if set forth in their entirety herein.

Some examples of ceramising glass-ceramic or glass, features of which may possibly be incorporated in an embodiment of the present invention may be found in U.S. Pat. No. 4,824,463 issued to Neuhoff et al. on Apr. 25, 1989 and entitled "Process for ceramising glass-ceramic sheets"; and U.S. Pat. No. 4,851,022 issued to Gunthner on Jul. 25, 1989 and entitled "Method and oven for ceramising glass plates", all of these U.S. patents being hereby expressly incorporated by reference as if set forth in their entirety herein.

Some examples of crystallizable glass and glass-ceramics made therefrom, features of which may possibly be incorporated in an embodiment of the present invention may be found in U.S. Pat. No. 3,970,463 issued to Planchock et al. on Jul. 20, 1976 and entitled "Glasses and glass-ceramics and products made therefrom"; U.S. Pat. No. 4,011,091 issued to McCollister on march 8, 1977 and entitled "Ceramic materials containing keatite"; U.S. Pat. No. 4,100,001 issued to Franklin on Jul. 11, 1978 and entitled "Thermally crystallizable glasses and glass-ceramics made therefrom"; U.S. Pat. No. 4,126,476 issued to Grossman on Nov. 21, 1978 and entitled "Aluminous quartz ceramics and method"; U.S. Pat. No. 4,391,914 issued to Beall et al. on Jul. 5, 1983 and entitled "Strengthened glass-ceramic article and method"; U.S. Pat. No. 6,197,710 B1 issued to Ohara et al. on Mar. 6, 2001 and entitled "Luminous glass ceramics"; and U.S. Pat. No. 6,204,211 B1 issued to Ohara et al. on Mar. 20, 2001 and entitled "Luminous glass ceramics", all of these U.S. patents being hereby expressly incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described herein above in the context of the preferred embodiments is not to be taken as limited to all of the provided details thereof, since modifications and variations thereof may be made without departing from the spirit and scope of the invention.

What is claimed is:

1. A lamp with an unpolished surface, said lamp comprising:

a support structure;

said support structure comprising a base end and a lamp support end;

a closed body;

said closed body being operatively connected to said lamp support end of said support structure;

said closed body comprising a source of light adapted to be connected to a source of power;

contacts to connect said source of light to a source of power;

a cover;

said cover being configured and disposed to permit light to exit said lamp when connected to a source of power;

said cover to permit light to exit said lamp comprising an inner surface facing the interior of said lamp and an outer surface facing away from said lamp;

at least said outer surface facing away from said lamp comprising unpolished glass being configured to provide said unpolished surface;

said glass being substantially free of pits and pores; and said glass being configured to have a surface roughness which is minimized to thus provide said outer surface.

2. The lamp according to claim 1 wherein said cover to permit light to exit said lamp comprises flat glass.

3. The lamp according to claim 1 wherein said unpolished glass of said outer surface comprising a surface having a roughness which is minimized to provide said unpolished surface comprises flat glass.

4. The lamp according to claim 1 wherein said cover to permit light to exit said lamp comprises float glass.

5. The lamp according to claim 3 wherein said cover to permit light to exit said lamp comprises float glass.

6. The lamp according to claim 2 wherein said cover to permit light to exit said lamp comprises float glass.

7. The lamp according to claim 6 wherein said portion to permit light to exit said lamp comprises prestressed glass.

8. In a lamp, which lamp comprising: a support structure; said support structure comprising a base end and a lamp support end; a closed body; said closed body being operatively connected to said lamp support end of said support structure and comprising a source of light adapted to be connected to a source of power; and contacts to connect said source of light to a source of power; a cover, said cover comprising:

- a transparent cover with an easy-to-clean, unpolished surface;
- said cover being configured and disposed to permit light to exit said lamp when connected to a source of power;
- said cover to permit light to exit said lamp comprising an inner surface facing the interior of said lamp and an outer surface facing away from said lamp;
- said cover to permit light to exit said lamp comprising substantially unpolished float glass;
- said unpolished float glass comprising glass ceramic float glass;
- at least said outer surface facing away from said lamp comprising said unpolished float glass being configured to provide said easy-to-clean, unpolished surface; and
- said unpolished float glass of said outer surface comprising a surface having a roughness which is minimized to provide said easy-to-clean surface.

9. The cover in a lamp according to claim 8 wherein said unpolished glass comprises thermally prestressed aluminosilicate float glass.

10. The cover in a lamp according to claim 8 wherein said cover comprises flat glass.

11. The cover in a lamp according to claim 10 wherein said unpolished glass has one of:

- a coefficient of thermal expansion $\alpha_{20/300}$, with a value in the range of 3.5 to $5.0 \times 10^{-6}$/K;
- a transformation temperature $T_g$ in the range of from 600° C. to 750° C.; and
- a processing temperature $V_A$ of said glass ceramic below 1350° C.

12. The cover in a lamp according to claim 11 wherein said glass ceramic has a coefficient of thermal expansion with keatite mixed crystals as the predominant crystal phase of less than one point five millionths per degree Kelvin.

13. The cover in a lamp according to claim 12 wherein said glass ceramic has one of:

- a coefficient of thermal expansion, with high quartz mixed crystals as the predominant phase, in the range of $-0.3 \times 10^{-6}$/K to $+0.3 \times 10^{-6}$/K; and
- a light transmittance of greater than eighty percent.

14. A transparent cover with an easy-to-clean, substantially unpolished surface in a lamp, said lamp comprising a support structure; said support structure comprising a base end and a lamp support end; a closed body; said closed body being operatively connected to said lamp support end of said support structure; said closed body comprising a source of light adapted to be connected to a source of power; contacts to connect said source of light to a source of power;

- said cover being configured and disposed to permit light to exit said lamp when connected to a source of power;
- said cover to permit light to exit said lamp comprising an inner surface facing the interior of said lamp and an outer surface facing away from said lamp;
- said cover to permit light to exit said lamp comprising substantially unpolished float glass;
- said substantially unpolished float glass comprising glass ceramic float glass;
- at least said outer surface facing away from said lamp comprising said substantially unpolished float glass being configured to provide said easy-to-clean, unpolished surface;
- said substantially unpolished float glass of said outer surface comprising a surface having a roughness which is minimized to provide said easy-to-clean surface.

15. The cover according to claim 14 wherein said surface of said substantially unpolished float glass has a predetermined roughness of at least one of:

(i) an average roughness $R_a \leq 0.02$ μm, and (ii) a squared average roughness $R_q \leq 0.01$ μm.

16. The cover according claim 15, said cover comprising thermally prestressed aluminosilicate float glass ceramic.

17. The cover according to claim 16, wherein said glass ceramic comprises:

- one of: high quartz mixed crystals and keatite mixed crystals;
- less than 300 ppb Pt;
- less than 30 ppb Rh;
- less than 1.5 wt. % ZnO;
- less than 1 wt. % $SnO_2$;
- in wt. % on an oxide basis:

| | |
|---|---|
| $Li_2O$ | 3.2–5.0 |
| $Na_2O$ | 0–1.5 |
| $K_2O$ | 0–1.5 |
| $\Sigma Na_2O + K_2O$ | 0.2–2.0 |
| MgO | 0.1–2.2 |
| CaO | 0–1.5 |
| SrO | 0–1.5 |
| BaO | 0–2.5 |
| ZnO | 0–<1.5 |
| $Al_2O_3$ | 19–25 |
| $SiO_2$ | 55–69 |
| $TiO_2$ | 1.0–5.0 |
| $ZrO_2$ | 1.0–2.5 |
| $SnO_2$ | 0–<1.0 |
| $\Sigma TiO_2 + ZrO_2 + SnO_2$ | 2.5–5.0 and |
| $P_2O_5$ | 0–3.0. |

18. The cover according to claim 17, wherein said glass ceramic further comprises:

(in wt. % on an oxide basis):

| | |
|---|---|
| $Li_2O$ | 3.5–4.5 |
| $Na_2O$ | 0.2–1.0 |
| $K_2O$ | 0–0.8 |
| $\Sigma Na_2O + K_2O$ | 0.4–1.5 |
| MgO | 0.3–2.0 |
| CaO | 0–1.0 |
| SrO | 0–1.0 |
| BaO | 0–2.5 |
| ZnO | 0–1.0 |
| $Al_2O_3$ | 19–24 |
| $SiO_2$ | 60–68 |
| $TiO_2$ | 1.0–2.0 |
| $ZrO_2$ | 1.2–2.2 |
| $SnO_2$ | 0–0.6 |
| $\Sigma TiO_2 + ZrO_2 + SnO_2$ | 3.0–4.5 |
| $P_2O_5$ | 0–2.0, | wherein 3.2 times the weight percent of ZnO plus the weight percent of $TiO_2$ is less than or equal to 4.3 weight percent to minimize the formation of a crystal band near the surface of the glass ceramic; and less than 200 ppb $Fe_2O_3$ and less than 2.5 wt. % $TiO_2$ to substantially minimize discoloration of said glass ceramic and to provide a light transmittance of one of: greater than 89% and greater than 90% at a thickness of said glass ceramic 4 mm.

19. The cover according to claim 18, wherein:
said glass ceramic is substantially free of BaO;
said glass ceramic has a coefficient of thermal expansion $\alpha_{20/300}$ between 3.5 and $5.0\times10^{-6}$/K;
said glass ceramic has a transformation temperature, $T_g$, between 600° C. and 750° C.;
said glass ceramic has a processing temperature, $V_A$, below 1350° C.; and
said glass ceramic comprises one of: no coloring components and at least one coloring component, said coloring components comprising at least one of: V, Cr, Mn, Fe, Go, Cu, Ni, Se and Cl compounds.

20. The cover according to claim 19, wherein:
said glass ceramic comprises keatite mixed crystals as the predominant crystal phase;
said glass ceramic has a coefficient of thermal expansion of less than $1.5\times10^{-6}$/K;
said glass ceramic comprises at least one chemical fining agent to minimize the number of bubbles in the glass ceramic;
said at least one chemical fining agent comprises at least one of: $SnO_2$, $CeO_2$, sulfate compounds, and chloride compounds, of which $SnO_2$ is in the range of 0.2–0.6 wt. %; and
said glass ceramic is substantially free of at least one of: arsenic oxide and antimony oxide.

21. The cover according to claim 19, wherein:
said glass ceramic comprises high quartz mixed crystals as the predominant phase;
said glass ceramic has a coefficient of thermal expansion of one of: $-0.3\times10^{-6}$/K to $+0.3\times10^{-6}$/K and $-0.15\times10^{-6}$/K to $+0.15\times10^{-6}$/K;
said glass ceramic has a light transmittance of greater than 80%;
said glass ceramic comprises at least one chemical fining agent to minimize the number of bubbles in the glass ceramic;
said at least one chemical fining agent comprises at least one of: $SnO_2$, $CeO_2$, sulfate compounds, and chloride compounds, of which $SnO_2$ is in the range of 0.2–0.6 wt. %; and
said glass ceramic is substantially free of at least one of: arsenic oxide and antimony oxide.

* * * * *

UNITED STATES PATENT AND TRADEMARK OFFICE
CERTIFICATE OF CORRECTION

PATENT NO. : 6,629,768 B2  Page 1 of 1
DATED : October 7, 2003
INVENTOR(S) : Sabine Melson and Peter Nass It is certified that error appears in the above-identified patent and that said Letters Patent is hereby corrected as shown below:

Column 23,
Line 12, after "Fe,", delete "Go," and insert -- Co, --.

Signed and Sealed this

Ninth Day of May, 2006

JON W. DUDAS
*Director of the United States Patent and Trademark Office*